April 16, 1963     W. L. MORRISON     3,085,884
METHOD OF FREEZING AND SHIPPING FOODSTUFFS
Filed July 28, 1958
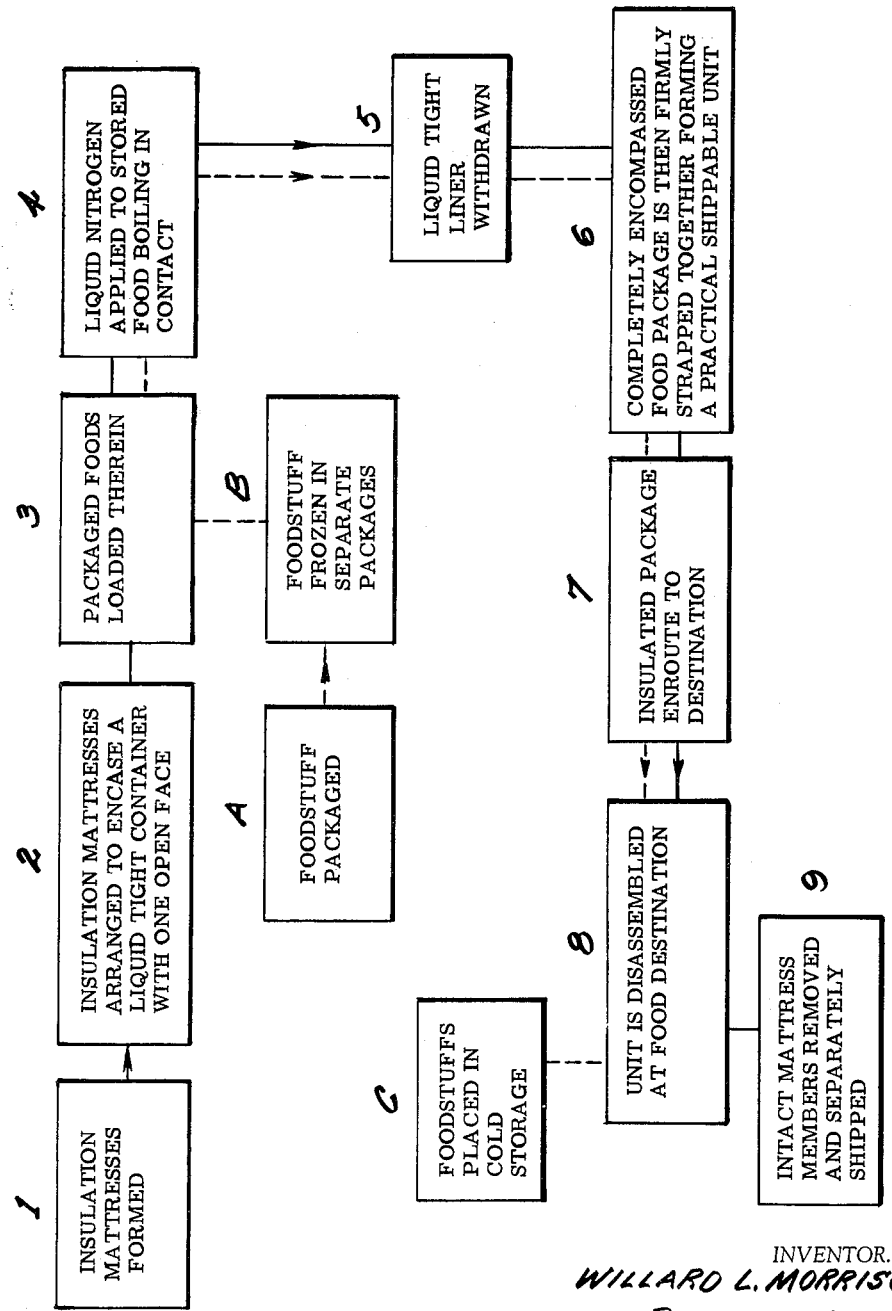
INVENTOR.
*WILLARD L. MORRISON*
BY *PARKER & CARTER*
*ATTORNEYS*

United States Patent Office 3,085,884
Patented Apr. 16, 1963

3,085,884
METHOD OF FREEZING AND SHIPPING FOODSTUFFS
Willard L. Morrison, Lake Forest, Ill., assignor, by mesne assignments, to Liquefreeze Company, Inc., New York, N.Y., a corporation of New York
Filed July 28, 1958, Ser. No. 751,211
3 Claims. (Cl. 99—192)

This invention involves the method of efficiently and economically shipping commodities and has for one object to provide a method whereby perishable goods which must be shipped in insulated packages may be associated with valuable commodities which do not need insulation but which can be assembled to provide the insulation for the perishable goods so that upon destination both the perishable goods and the insulation may be separated and each separately made use of.

Another object is to provide a method whereby two separate types of commodities each of which originates at and is shipped to similar points may be shipped together and one of the commodities may be given a dual purpose whereby in addition to its travel to destination it serves as an insulator during such travel.

Another object is to provide for shipment with material requiring insulation, means to furnish such insulation which means do not require return to origin but are efficiently and economically used at destination.

I propose for example on the west coast of the United States to provide a supply of frozen foodstuff, to build an insulating container which will enclose such foodstuff, to then, after the foodstuff is in the container, discharge liquid nitrogen or similar low boiling liquids into the container at atmospheric pressure whereby heat will be abstracted from the foodstuffs until a desired low temperature is obtained. Thereafter, the container will be sealed up with the superchilled foodstuffs therein, will be shipped to the Atlantic coast where the foodstuffs will be unpacked and placed in cold storage.

The insulation will take the form, for example, of raw wool which originates on the Pacific coast and is normally shipped to the Atlantic seaboard.

The invention is illustrated in the accompanying drawing wherein a diagrammatic flow sheet is illustrated.

Like parts are indicated by like characters throughout the specification and drawings.

First, a plurality of insulation mattresses are formed, preferably of raw wool, at station 1 of the drawing. These insulation mattresses will be arranged to encase a removable liquid tight container having one open face, as at station 2, thus forming a portable container. Thereafter, at station 3, packaged foods will be loaded into the open container, the foodstuffs having been packaged at A and if desired, frozen in separate packages at B before being loaded in the insulation container, although foodstuffs might be loaded in the container without prefreezing.

At station 4, the liquid nitrogen is applied to the stored food in the mattress insulated liner, boiling in contact with the food.

At 5, the liquid tight liner is withdrawn from the unit composed of the food, the liner, and the mattresses after the foodstuffs have been frozen to the desired low temperature.

At 6, the container is closed and the completely encompassed food package is firmly strapped or otherwise firmly held together forming a tight, practicable shipping unit with the frozen food contained in the insulated container and the mattresses or panels of compressed wool furnishing the insulation.

At 7, the insulation package is enroute to destination. At 8, the unit is disassembled at the food destination and the foodstuffs are placed in cold storage at C, and the intact separate mattress members are removed from the food and separately shipped to their destination.

The path of the foodstuffs is illustrated in dotted lines. The path of destination is illustrated in full lines. It will be noted that at beginning and end, the insulation and foodstuffs are separate and have separate travel. In between, they travel together.

The result of this is that instead of paying freight on a shipper container which merely adds to the cost, freight is paid on the wool which it is desired to ship in any event so that by putting together the wool and the food, they travel in unison and the wool in a sense because it is an exceedingly effective insulation, pays its way by furnishing the insulation as it travels.

I claim:
1. A method of eliminating dead weight in the shipment of foodstuffs, said method including the steps of
    packing raw wool material having good insulating properties about a quantity of said foodstuffs which are frozen prior to shipment by exposure to nitrogen at a temperature far below 0° F. to thereby provide a shipping unit comprising an insulating layer enclosing said foodstuffs,
    transporting the shipping unit to a desired destination,
    disassembling the insulating layer from the foodstuffs at said destination, and
    thereafter separately utilizing the foodstuffs and raw wool material.

2. The method of claim 1 further characterized in that the nitrogen is at substantially atmospheric pressure and in liquid form at the time the foodstuffs are exposed to it.

3. The method of claim 1 further including the step of prefreezing the foodstuffs prior to their exposure to the nitrogen.

References Cited in the file of this patent
UNITED STATES PATENTS
2,618,939     Morrison _____ Nov. 25, 1952

FOREIGN PATENTS
21,155/29     Australia _____ Jan. 14, 1930